(12) United States Patent
Park et al.

(10) Patent No.: US 11,972,389 B2
(45) Date of Patent: Apr. 30, 2024

(54) APPARATUS FOR MANAGING DELIVERY OF UNMANNED AERIAL VEHICLE AND METHOD FOR THE SAME

(71) Applicant: ELECTRONICS AND TELECOMMUNICATIONS RESEARCH INSTITUTE, Daejeon (KR)

(72) Inventors: Moon Sung Park, Daejeon (KR); Yeong Woong Yu, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 39 days.

(21) Appl. No.: 17/323,538

(22) Filed: May 18, 2021

(65) Prior Publication Data

US 2021/0365881 A1 Nov. 25, 2021

(30) Foreign Application Priority Data

May 19, 2020 (KR) .................. 10-2020-0059542

(51) Int. Cl.
*G06Q 10/0833* (2023.01)
*G08G 5/00* (2006.01)

(52) U.S. Cl.
CPC ....... *G06Q 10/0833* (2013.01); *G08G 5/0034* (2013.01); *G08G 5/0069* (2013.01)

(58) Field of Classification Search
CPC ...................................................... G06Q 50/30
(Continued)

(56) References Cited

U.S. PATENT DOCUMENTS

2012/0158237 A1 6/2012 Lee et al.
2015/0212206 A1 7/2015 Lee et al.
(Continued)

FOREIGN PATENT DOCUMENTS

JP 2018147467 A * 9/2018 .......... B64C 39/024
KR 10-2009-0089049 8/2009
(Continued)

OTHER PUBLICATIONS

R. Zhang, C. Zheng and p. Yan, "Route Planning for Unmanned Air Vehicles with Multiple Missions Using an Evolutionary Algorithm," Third International Conference on Natural Computation (ICNC 2007), Haikou, China, 2007, pp. 23-28, doi: 10.1109/ICNC.2007.644. (Year: 2007).*

(Continued)

*Primary Examiner* — Jeff Zimmerman
*Assistant Examiner* — Hunter A Molnar
(74) *Attorney, Agent, or Firm* — KILE PARK REED & HOUTTEMAN PLLC

(57) ABSTRACT

Disclosed herein is an unmanned delivery management device. The unmanned delivery management device according to an embodiment of the present disclosure may include: a travel route manager, a delivery information manager, an obstacle analyzer, and a UAV control manager. Wherein the travel route manager is configured to confirm delivery mission information provided by a user terminal, to set a waypoint based on the delivery mission information, to set a travel route including a waypoint for a takeoff segment, a landing segment and a flight segment, and to correct the travel route according to a travel condition of a UAV.

10 Claims, 11 Drawing Sheets

(58) Field of Classification Search
USPC .......................................................... 705/333
See application file for complete search history.

(56) References Cited

U.S. PATENT DOCUMENTS

| | | | |
|---|---|---|---|
| 2016/0085238 | A1 | 3/2016 | Hayes |
| 2018/0090014 | A1* | 3/2018 | Kline ..................... G05D 1/104 |
| 2018/0174102 | A1* | 6/2018 | Winkle ................. G05D 1/0676 |
| 2019/0033084 | A1* | 1/2019 | Chen ................... G01C 21/3415 |
| 2021/0264796 | A1* | 8/2021 | Chen ..................... G05D 1/0646 |
| 2021/0318697 | A1* | 10/2021 | Tehrani .................. B64C 27/06 |

FOREIGN PATENT DOCUMENTS

| | | |
|---|---|---|
| KR | 10-2012-0037228 | 4/2012 |
| KR | 10-2016-0020454 | 2/2016 |
| KR | 10-2016-0074895 | 6/2016 |
| KR | 10-2016-0074896 | 6/2016 |
| KR | 10-2016-0107819 | 9/2016 |
| KR | 10-2017-0043946 | 4/2017 |
| KR | 10-2018-0110918 | 10/2018 |
| KR | 10-1946429 | 5/2019 |

OTHER PUBLICATIONS

Dong-Il You et al., "Design a Path Following Line-of-Sight Guidance Law based on Vehicle Kinematics", Journal of the Korean Society for Aeronautical & Space Sciences, Jun. 1, 2012, pp. 506-514.

H. S. Cho et al., "Optimal Flight Path Using 2D Data Model", Proceeding of Korea Information Science Society, vol. 23 (1A) Apr. 1996, pp. 881-884.

* cited by examiner

APPARATUS FOR MANAGING DELIVERY OF UNMANNED AERIAL VEHICLE AND METHOD FOR THE SAME

CROSS REFERENCE TO RELATED APPLICATION

The present application claims priority to a K.R. application 10-2020-0059542, filed May 19, 2020, the entire contents of which are incorporated herein for all purposes by this reference.

BACKGROUND OF THE INVENTION

Field of the Invention

The present disclosure relates to a method and apparatus for delivering an article, and more particularly, to a method and apparatus for delivering an article by means of an unmanned air vehicle.

Description of the Related Art

The term "drone" collectively refers to an unmanned aerial vehicle (UAV). A drone is a powered aerial vehicle that does not carry a human operator, uses aerodynamic forces to provide vehicle lift, flies autonomously or be piloted remotely, can carry a lethal or nonlethal payload, and can be expendable or recoverable.

A variety of UAVs are being developed by virtue of technological advances, and although originated in the military sector, various drones are applied in the civil sector. Being typically spread as a hobby, UAVs are controlled by remote operators within the operators' line of sight. However, various attempts are being made to provide (deliver) various goods like an article with small takeoff weight, documents, books and first aid supplies to a remote place using a UAV.

SUMMARY

However, as for the delivery of goods using UAVs, the battery depletion and travel range of a UAV and the weight of an item shippable on the UAV are barriers causing hindrance in commercial applications.

Especially, topographic and terrain features present in a region, in which a UAV is moved, may hinder the UAV from traveling, or regulations may restrict the travel of UAVs. Accordingly, the travel path of a UAV needs to be controlled by considering such conditions.

Being devised in consideration of what is described above, the present disclosure has an object to provide a method and apparatus for setting a travel path (flight plan) in which a UAV may be moved efficiently and safely.

Also, the present disclosure has another object to provide a method and apparatus for minimizing the change of direction according to the change of altitude and for enabling a UAV to travel in a safe region.

Also, the present disclosure has yet another object to provide a method and apparatus for safely operating a UAV in various situations (route/altitude deviation, lack of battery power, etc.) that are likely to occur during the delivery of an article to a destination.

The technical objects of the present disclosure are not limited to the above-mentioned technical objects, and other technical objects that are not mentioned will be clearly understood by those skilled in the art through the following descriptions.

According to one aspect of the present disclosure, an unmanned delivery management device may be provided. The device may include: a travel route manager configured to confirm delivery mission information provided by a user terminal, to set a waypoint based on the delivery mission information, to set a travel route including a waypoint for a takeoff segment, a landing segment and a flight segment, and to correct the travel route according to a travel condition of a UAV; a delivery information manager configured to manage delivery mission information including a delivery destination of an article and a delivery method of the article and to provide the delivery mission information to the travel route manager; an obstacle analyzer configured to monitor a location and status information of the UAV and to analyze an obstacle of the UAV; and a UAV control manager configured to generate UAV control information necessary for travel control of the UAV and delivery control of the article based on the travel route and to provide the information to the UAV.

The features briefly summarized above with respect to the present disclosure are merely exemplary aspects of the detailed description below of the present disclosure, and do not limit the scope of the present disclosure.

According to the present disclosure, a method and apparatus for setting a travel path (flight plan) in which a UAV may be moved efficiently and safely may be provided.

Also, according to the present disclosure, a method and apparatus for minimizing the change of direction according to the change of altitude and for enabling a UAV to travel in a safe region may be provided.

Also, according to the present disclosure, a method and apparatus for safely operating a UAV in various situations (route/altitude deviation, lack of battery power, etc.), which are likely to occur during the delivery of an article to a destination, may be provided.

Effects obtained in the present disclosure are not limited to the above-mentioned effect, and other effects not mentioned above may be clearly understood by those skilled in the art from the following description.

DETAILED DESCRIPTION

Figure 1:
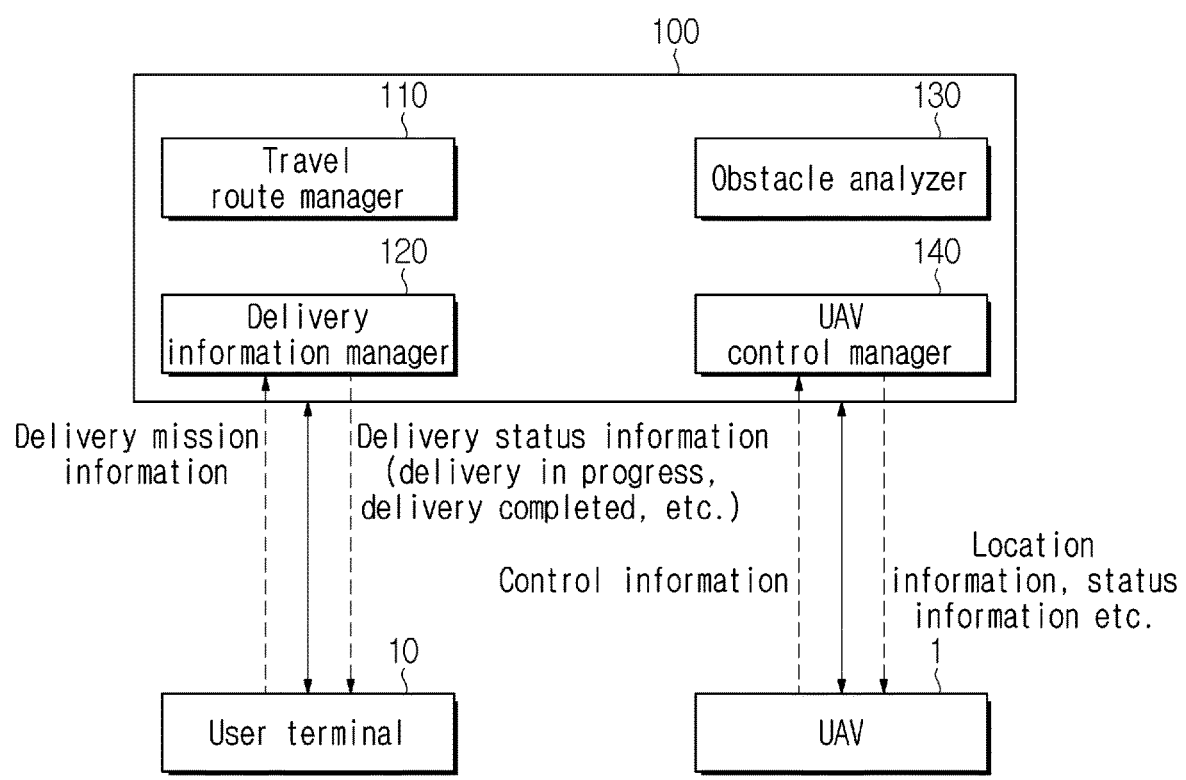
FIG. 1 is a block diagram illustrating a configuration of an unmanned delivery management device according to an embodiment of the present disclosure.

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinafter, embodiments of the present disclosure will be described with reference to the accompanying drawings.

FIG. 1 is a block diagram illustrating a configuration of an unmanned delivery management device according to an embodiment of the present disclosure.

An unmanned delivery management device 100 may organize and provide travel path information, article delivery information, obstacle information, and emergency flight information, which are necessary for an unmanned aerial vehicle (UAV) 1 to process delivery of an article, to the UAV 1. For this, the unmanned delivery management device 100 may receive an input of delivery mission information or be connected to a user terminal 10 capable of displaying delivery completion information.

In an embodiment of the present disclosure, travel path information may be information including a necessary path for the UAV's travel, article delivery information may be information including a destination to which the UAV delivers an article, obstacle information may be information including the location, altitude and type of an obstacle, and emergency flight information may include location information on an emergency landing spot indicating an area in which the UAV may land in emergency. Also, delivery mission information may include a delivery mission identifier, address information of a delivery destination, and delivery conditions (e.g., safe delivery preferred (extra attention to fragility), fast delivery preferred, etc.), and delivery completion information may include information indicating whether or not the delivery of an article is completed.

The unmanned delivery management device 100 may include a travel route manager 110, a delivery information manager 120, an obstacle analyzer 130, and a UAV control manager 140.

The travel route manager 110 may confirm delivery mission information provided by the user terminal 10 and confirm at least one piece of article delivery information corresponding to each delivery mission. The travel route manager 110 may set a travel route of the UAV 10 by setting a delivery destination including in at least one piece of article delivery information as a waypoint. Herein, the travel route manager 110 may determine an order of article delivery by considering location information of a delivery destination included in at least one piece of article delivery information and may set a waypoint based on the determined order. Also, the travel route manager 110 may set a travel route by considering a geographical feature (e.g., an island, a highland, etc.).

The travel route manager 110 may first generate a candidate travel route and finally determine a travel route by considering the travel distance, travel speed and delivery conditions of the generated candidate route. Also, the travel route manager 110 may determine an optimal travel route by considering the takeoff and landing segments of a delivery destination. Furthermore, a detailed operation of the travel route manager 110 for determining a travel route will be described in detail through FIG. 2 below.

Furthermore, there may be various types of UAVs, and different performances may be produced according to types of UAVs. Thus, according to types of UAVs, the travel distance, travel speed and residual battery capacity of a travel route may be different. In consideration of this, the travel route manager 110 may store and manage performance information according to types of UAVs. Also, the travel route manager 110 may determine an optimal travel route by further considering performance according to a UAV type.

The delivery information manager 120 may manage delivery mission information and, when the UAV 1 arrives at a delivery destination, may control a delivery method (e.g., handover or drop) of a corresponding article by considering information listed in the delivery mission information. Also, the delivery information manager 120 may add, delete or combine delivery waypoints by integrating delivery mission information. For example, the delivery information manager 120 may integrate and manage delivery destinations included within a predetermined range into a single delivery destination. Also, the delivery information manager 120 may confirm whether or not a delivery mission is normally completed and may manage delivery completion information.

The obstacle analyzer 130 may confirm the occurrence of an obstacle by monitoring the status of the UAV 1 and may generate control information of the UAV 1 corresponding to the occurrence of the obstacle. For this, the obstacle analyzer 130 may store and manage a condition of obstacle occurrence and a response mission when an obstacle occurs. For example, a condition of obstacle occurrence may include "geography and approach of UAV to obstacle (e.g., a transmission tower, an antenna facility, a UAV)", and a corresponding response mission may include "obstacle (e.g., a transmission tower, an antenna facility, a UAV) avoidance". For this, the obstacle analyzer 130 may store and manage obstacle information (e.g., an obstacle type, an obstacle size, and an obstacle location). As another example, a condition of obstacle occurrence may include "error occurrence of the UAV 1", "low power state", "altitude deviation', and "path deviation", and a corresponding response mission may include "move to emergency landing spot". Accordingly, the obstacle analyzer 130 may confirm an emergency landing spot nearest (or requiring a shortest time) from a location of the UAV 1 and generate and provide the UAV 1 with a mission to move to the emergency landing spot.

Although, in an embodiment of the present disclosure, the obstacle analyzer 130 was illustrated to generate a response mission to move to an emergency landing spot, but the present disclosure is not limited thereto, and the response mission may differ variously. For example, a response mission may include an operation of moving to a nearest delivery destination (or requiring a shortest time) and a move to the nearer spot between a delivery destination and an emergency landing spot.

The UAV control manager 140 may control an operation of the UAV 1 by confirming the generation of a travel route, a delivery mission and an obstacle response mission and delivering the confirmed travel route, delivery mission and obstacle response mission to the UAV 1. Also, the UAV control manager 140 may monitor a location of the UAV 1 or status information (e.g., battery residual capacity) of the UAV 1 and may provide the location or the status information to the obstacle analyzer 130.

Hereinafter, an operation of the travel route manager 110 for determining a travel route will be described.

Figure 2:
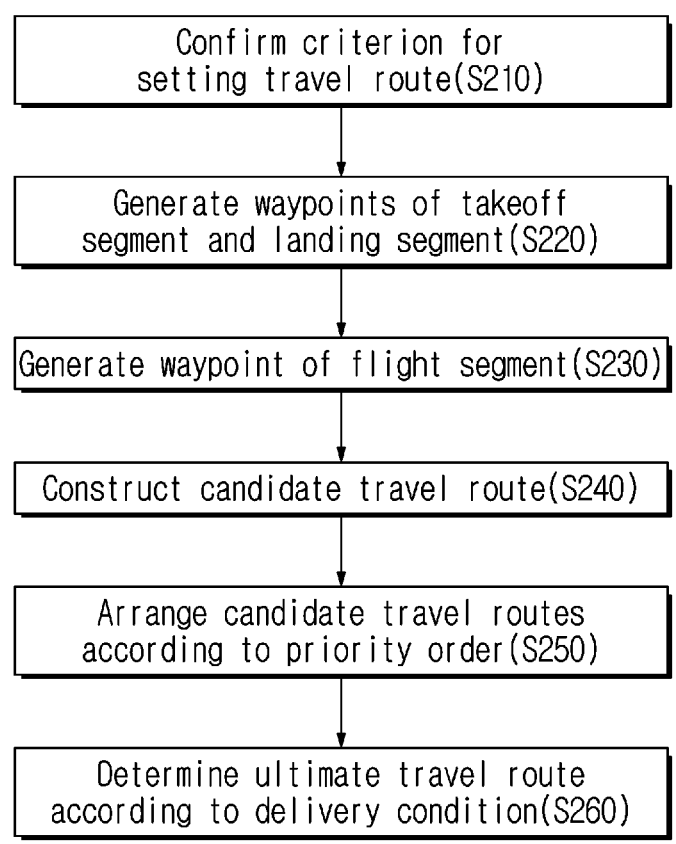
FIG. 2 is a view illustrating an operation of an unmanned delivery management device for setting a travel route according to an embodiment of the present disclosure.

FIG. 2 is a view illustrating an operation of an unmanned delivery management device for setting a travel route according to an embodiment of the present disclosure.

When article delivery information is received, in order to generate a travel route, the travel route manager may confirm a criterion for setting a travel route by checking a topographic feature and obstacle information (obstacle type, obstacle location, size, etc.) for each delivery segment and checking an altitudinal range of safety flight segment based on the topographic feature and obstacle information (S210).

The travel route manager may generate a waypoint for travel within a safety flight segment by considering a takeoff altitude and a travel condition. The travel route manager may determine a waypoint necessary to set a travel route by distinguishing a takeoff segment, a landing segment, and a flight segment (S220, S230). For example, the travel route manager may generate a waypoint of the takeoff segment or the landing segment by comparing an altitudinal range of safety flight with a highest value of topographic altitude at a departure point and a delivery destination and a highest altitude of a topographic obstacle (S220). Specifically, when the highest value of topographic altitude at the departure point and the delivery destination and the highest altitude of the topographic obstacle are within the altitudinal range of safety flight, the travel route manager may generate a waypoint by applying various conditions for traveling within the safety flight segment.

Furthermore, an operation of generating a waypoint for travel within a flight segment will be described in detail through FIG. 3 below.

In order to reflect a safer and more flightworthy condition in a travel route, the travel route manager may construct a candidate travel route by combining waypoints or correcting a location of waypoint (S240).

Also, the travel route manager may determine a priority order of candidate travel routes by considering a time required for delivery (travel distance), power consumption, and travel safety (travel angle, number of waypoints, etc.) and may arrange the candidate travel routes according to the priority order thus determined (S250).

Next, the travel route manager may determine an ultimate travel route based on the candidate travel routes that are arranged according to the priority order (S260). Herein, when determining a travel route, the travel route manager may determine a candidate travel route suitable for a delivery condition (e.g., safe delivery preferred, fast delivery preferred, etc.). Also, the travel route manager may determine a delivery method (e.g., landing and drop) by considering a characteristic of a delivery destination, a delivery condition, etc., and may generate a delivery mission suitable for such a delivery method.

Figure 3:
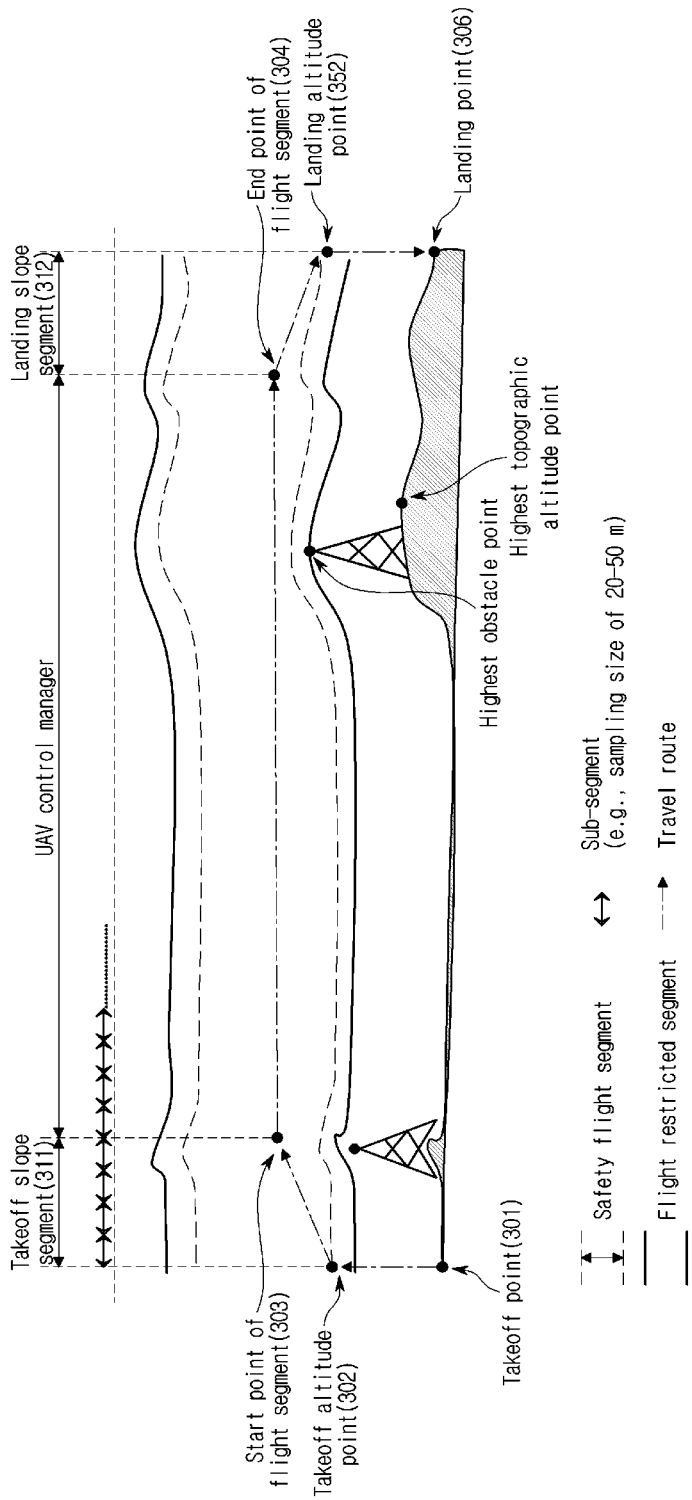
FIG. 3 is a view illustrating setting a waypoint of a flight segment by an unmanned delivery management device according to an embodiment of the present disclosure.

FIG. 3 is a view illustrating setting a waypoint of a flight segment by an unmanned delivery management device according to an embodiment of the present disclosure. In order to generate a travel route for each travel segment for delivery, the travel route manager may create data of travel route generation condition, from which a topographic altitude value may be obtained and to which an obstacle altitude is applied, and may confirm a takeoff altitude of a takeoff segment and an arrival altitude of a landing segment. Herein, the height of an obstacle may be reflected.

Specifically, after moving from a takeoff point 301 to a takeoff altitude point 302, a UAV may move from the takeoff altitude point 302 to a start point 303 of flight segment. Next, after moving from the start point 303 of flight segment to an end point 304 of flight segment, the UAV may move from the end point 304 of flight segment to a landing point 306 through a landing altitude point 305. In the above-described environment, the segment from the takeoff altitude point 302 to the start point 303 of flight segment may be referred to as a takeoff slope segment 311, and the segment from the takeoff point 301 to the start point 303 of flight segment may be referred to as a takeoff segment. Similarly, the segment from the end point 304 of flight segment to the landing altitude point 305 may be referred to as a landing slope segment 312, and the segment from the end point 304 of flight segment to the landing point 306 may be referred to as a landing segment.

In a flight segment 313, when the sum of a highest value of topographic altitude and a highest altitude of topographic obstacle is within an altitude range of safety flight segment, the travel route manager may set the waypoints of the start point 303 and the end point 304 in the flight segment at a same altitude. Also, the travel route manager may construct a travel route including the takeoff point 301, the takeoff altitude point 302, the start point 303 of flight segment, the end point 304 of flight segment, the landing altitude point 305, and the landing point 306.

Meanwhile, when it is determined that horizontal flight is impossible in a flight segment, the travel route manager may set waypoints by dividing the flight segment into sub-segments with a predetermined size (e.g., 10 m to 50 m).

For example, the travel route manager may set a waypoint by considering highest topographic altitude value and obstacle altitude in each sub-segment.

Hereinafter, referring to FIG. 4A to FIG. 4D, an operation of setting a waypoint in a flight segment that are divided into sub-segments will be described.

Figure 4A:
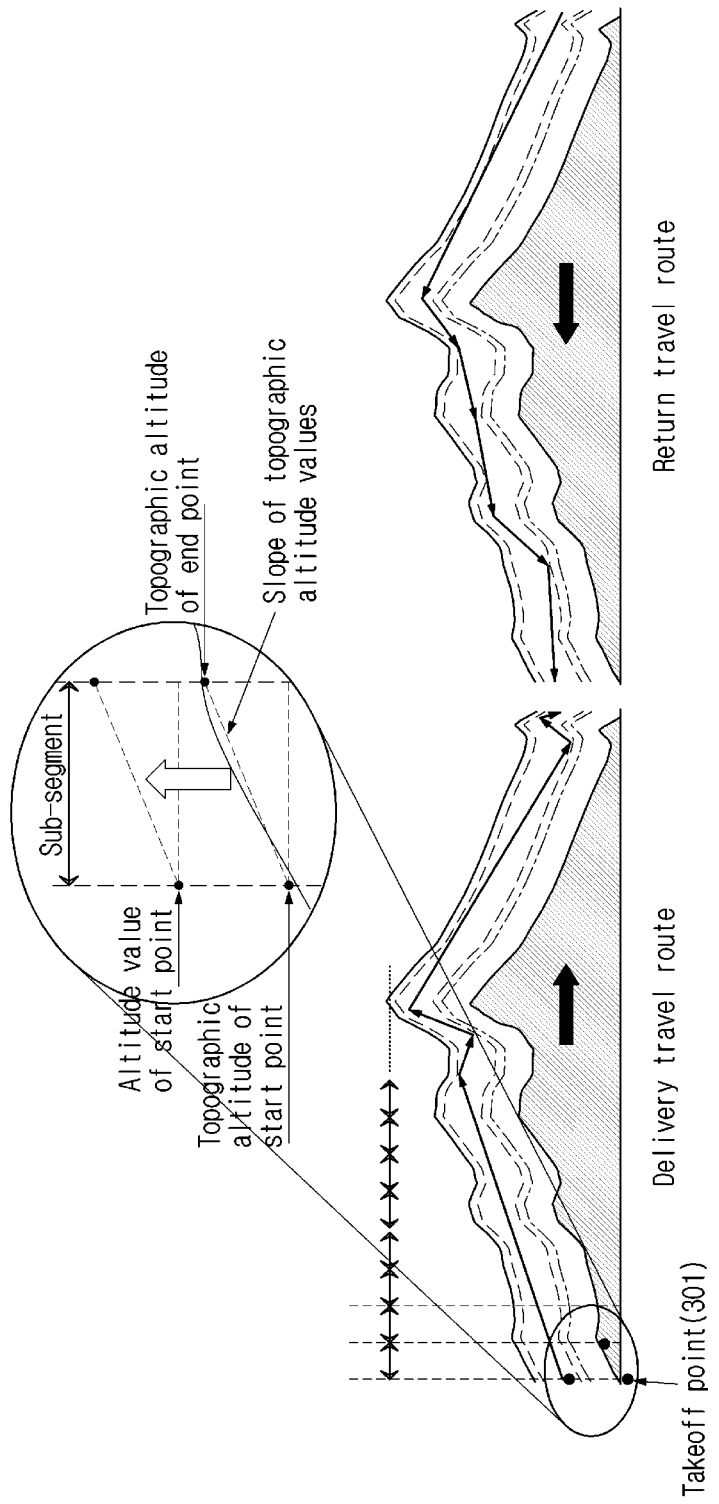
FIG. 4A to FIG. 4D are views illustrating a criterion of an unmanned delivery management device for setting a waypoint in each sub-segment according to an embodiment of the present disclosure.
Figure 4B:
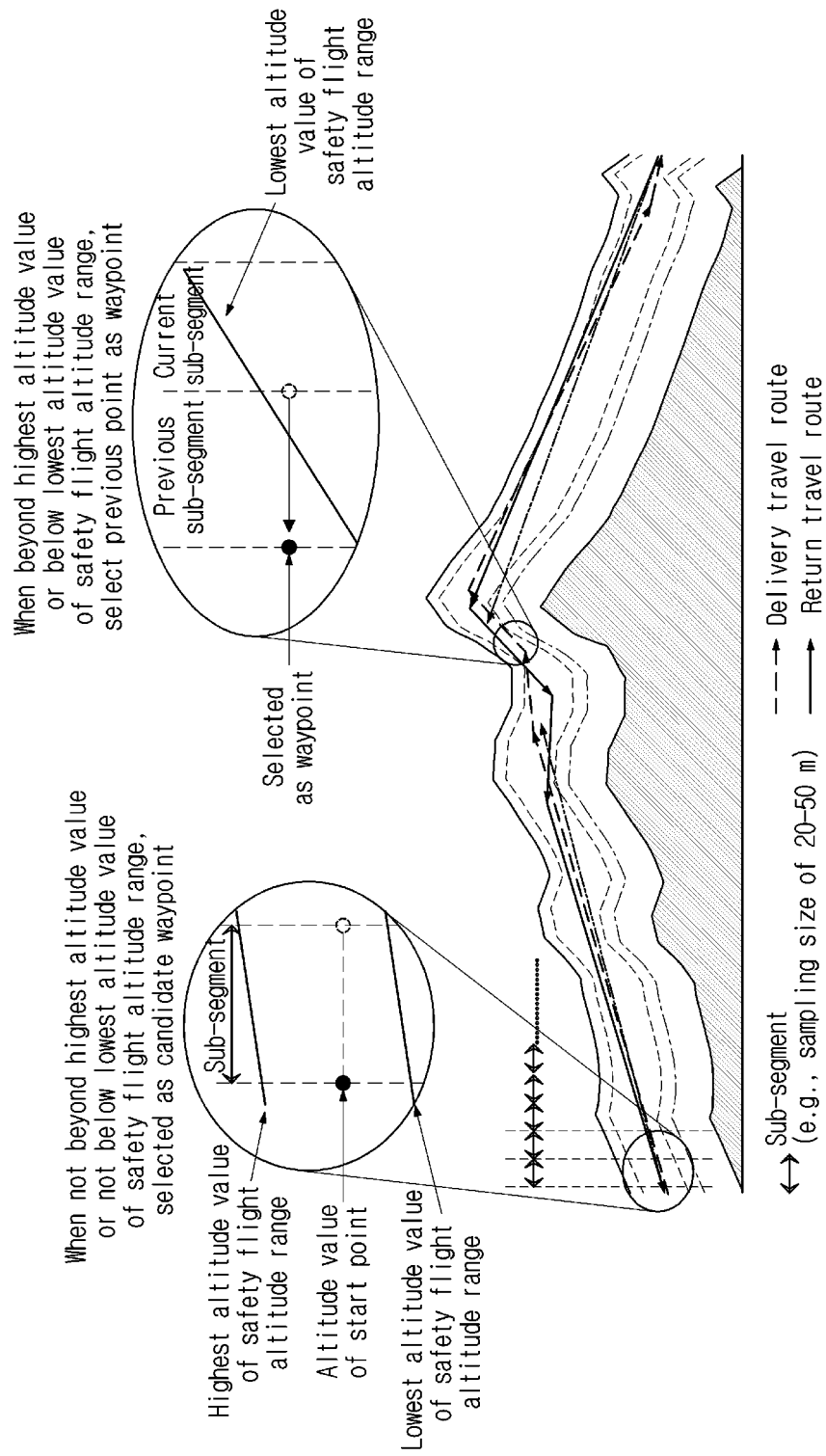
Figure 4C:
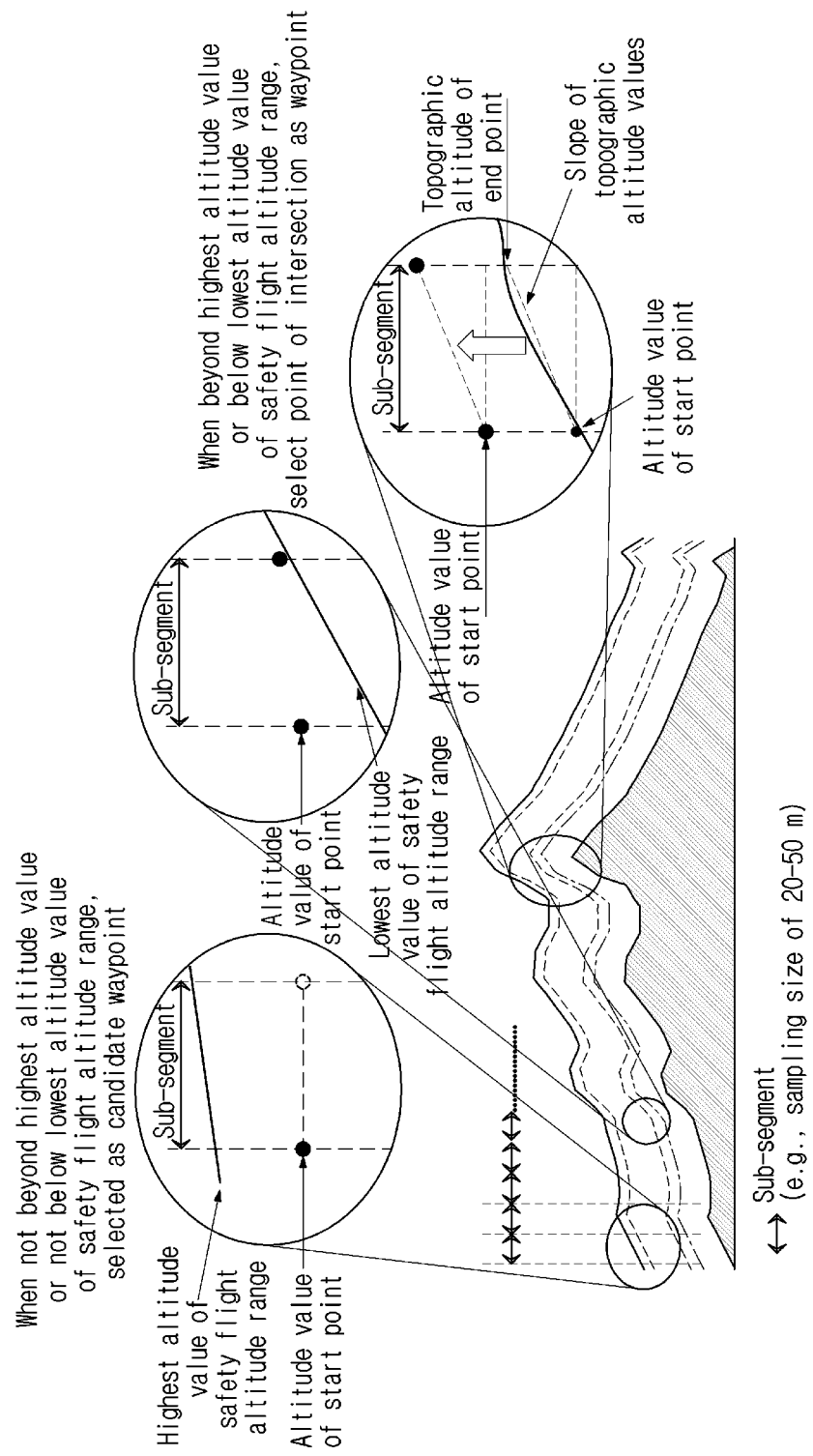

FIG. 4A to FIG. 4C are views illustrating a criterion of an unmanned delivery management device for setting a waypoint in each sub-segment according to an embodiment of the present disclosure.

First, FIG. 4A illustrates an operation of setting a waypoint based on a change of topographic altitude and a safety flight altitude value. Referring to FIG. 4A, a travel route manager may determine a waypoint in a sub-segment unit by repeatedly applying a change of topographic altitude and an altitude value of safety flight segment either in the order of maximum and minimum values or in the order of minimum and maximum values. In addition, when all the sub-segments of a connecting segment are within the safety flight altitude range, the travel route manager may determine a previous point as a candidate waypoint in the case of deviation from the safety flight altitude range in comparison with a next point In addition, the travel route manager may generate a travel route using a candidate waypoint. The travel route manager may confirm a topographic altitude value of a start point in sub-segment units and a topographic altitude value of an end point and may confirm a slope made by the topographic altitude values of the start point and the end point. In addition, the travel route manager may confirm an altitude value of an end point by applying a slope to an altitude value of a start point in a sub-segment. When the altitude value of the end point thus calculated is within a safety flight altitude range, the travel route manager may determine the end point of the sub-segment as a waypoint. On the other hand, when the altitude value of the end point thus calculated is not within a safety flight altitude range, the travel route manager may does not determine the end point of the sub-segment as a waypoint. Accordingly, the travel route manager may use only the start point of the sub-segment as a waypoint and may use the start point of the sub-segment as a waypoint connected to a next sub-segment. The travel route manager may determine waypoints within a flight segment by repeating the above-described operation for sub-segments.

As another example, FIG. 4B illustrates an operation of setting a location for determining a waypoint by applying a takeoff altitude of a UAV and a start point of a flight segment or an altitude value of a previous candidate waypoint to a waypoint location value.

Referring to FIG. 4B, a travel route manager uses an altitude value of a start point of a sub-segment as a criterion and checks whether or not the criterion exceeds a highest altitude value or a lowest altitude value of a safety flight altitude range in sub-segments. When a location criterion value for determining a location of a waypoint exceeds a highest altitude value or lowest altitude value of a safety flight altitude range of a sub-segment, the travel route manager may determine a waypoint by checking a point of intersection between an altitude value of a start point of the sub-segment and the highest altitude value or lowest altitude value of the safety flight altitude range. Also, when there is a point in which a start point of waypoint check and an altitude value of a sub-segment at a waypoint check position exceed a safety flight altitude range, the travel route manager may set a point, which precedes the sub-segment exceeding the safety flight altitude range, as a waypoint. Herein, the preceding point may include a start point or an end point of a previous sub-segment of the current sub-segment.

As another example, the preceding point may include a waypoint preceding the current sub-segment. The travel route manager may determine waypoints within a flight segment by repeating the above-described operation for sub-segments. As another example, FIG. 4C illustrates an operation of setting a waypoint based on horizontal movement.

Referring to FIG. 4C, a travel route manager may generate a travel route by applying a segment, which enables movement within a safety flight altitude range without any change of altitude from an altitude value of a start point, as a horizontal segment and applying a change of topographic altitude at an end point of segment.

Specifically, the travel route manager checks whether or not an altitude value of a start point exceeds a highest altitude value or a lowest altitude value of a safety flight altitude range in sub-segments. When the altitude value of the start point does not exceed a highest altitude value or a lowest altitude value of a safety flight altitude range in a sub-segment, the travel route manager does not set an end point of the sub-segment as a waypoint. On the other hand, when the altitude value of the start point of the sub-segment exceeds the highest altitude value or lowest altitude value of the safety flight altitude range in the sub-segment, the travel route manager may select a point of intersection between the altitude value of the start point and the highest altitude value or the lowest altitude value as a target to be set as a waypoint, set the waypoint thus set as a start point of the sub-segment, confirm a topographic altitude value of the start point of the sub-segment and a topographic altitude value of an end point of the target to be set as a waypoint, and confirm a slope made by the topographic values of the start point and the end point. In addition, the travel route manager may confirm an altitude value of an end point by applying a slope to an altitude value of a start point in a sub-segment. When the altitude value of the end point thus calculated is within a safety flight altitude range, the travel route manager may determine the end point of the sub-segment as a waypoint. On the other hand, an altitude value of an end point, which is calculated thus, is not within a safety flight altitude range, the travel route manager may set a previous waypoint check point (that is, a location corresponding to a target location for setting a waypoint-1 or -2) as a waypoint.

Furthermore, when a waypoint is set through the above-described operation, the travel route manager may confirm a point of intersection between an altitude value of a start point of a sub-segment and a highest altitude value or lowest altitude value of a safety flight altitude range, perform an operation of setting a target to be determined as a waypoint and then check whether or not sub-segments in a checking zone are out of the safety flight altitude range. Then, the travel route manager may set a waypoint.

The travel route manager may determine waypoints within a flight segment by repeating the above-described operation for sub-segments.

Figure 4D:
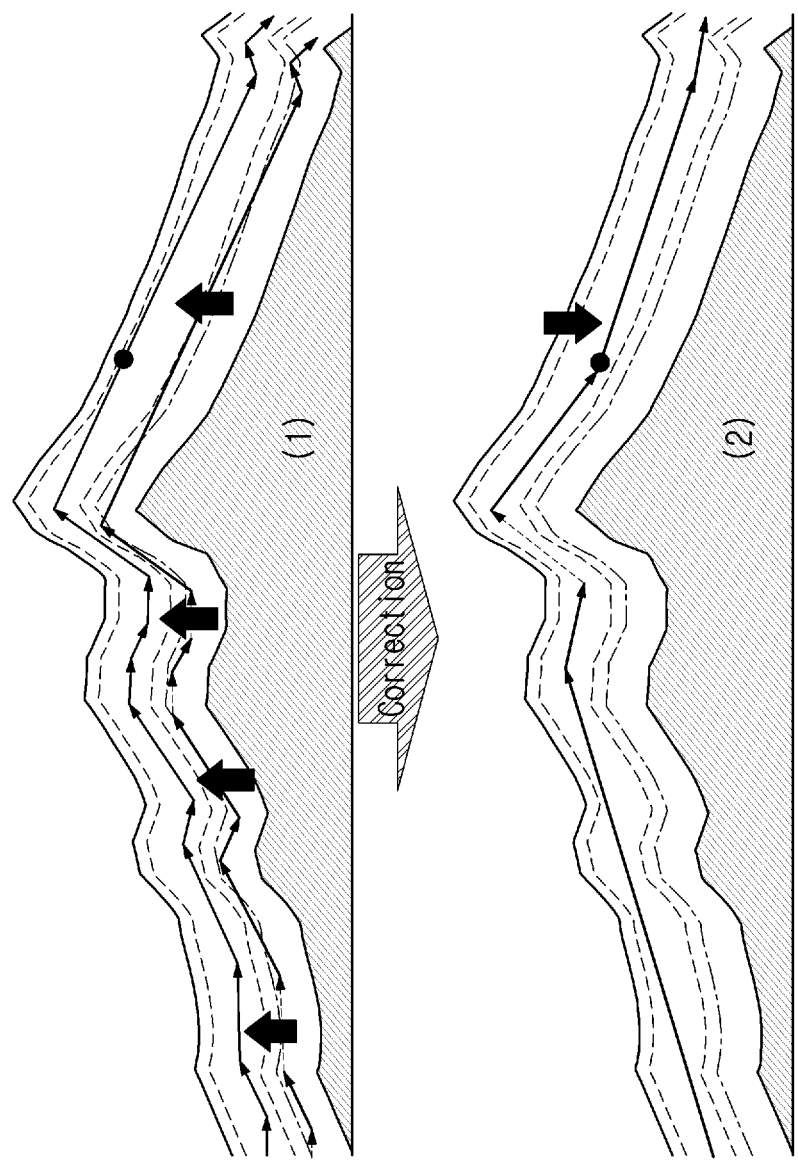

As another example, FIG. 4D illustrates an operation of setting a waypoint based on difference from previous topographic altitude value.

Referring to FIG. 4D, a travel route manger makes a comparison in sub-segment units (e.g., 10-50 m) and sets an end point of horizontal movement, that is, a waypoint, when a difference (e.g., ±10 m) from the topographic altitude value of a previous waypoint is exceeded, an up-sloping segment when an altitude difference of a next sub-segment has a positive value (+), a candidate point for changing to a down-sloping segment when an altitude difference of a next sub-segment has a negative value (−), a horizontal move segment when a cumulative altitude change is within a predetermined value (e.g., ±10 m), a down-sloping segment when the cumulative altitude change is −10 m and below, and a change point to an up-sloping segment when the cumulative altitude change is +10 m and above. Herein, it is possible to determine a value, which is obtained by dividing a cumulative travel altitude value by the number of travel points, as a reference value for an altitude of waypoint location.

Furthermore, the travel route manager may apply a takeoff altitude value to a waypoint altitude value. By reflecting a takeoff altitude value in sub-segment units (e.g., 10 m), a point, where a travel altitude value of a sloping segment (e.g., an up-sloping segment, a down-sloping segment, etc.) exceeds a safety flight altitude range, may be designated as a waypoint, and a slope value may be applied and corrected.

As described above, the travel route manager may set waypoints of sub-segments according to various setting criteria. Next, the travel route manager may generate a candidate travel route by combining the waypoints, which are determined based on various setting criteria, and finally determine a travel route by considering the travel distance, travel speed and delivery conditions of the generated candidate route.

Hereinafter, an operation of a travel route manager for generating a candidate travel route by combining waypoints determined based on various setting criteria is illustrated.

Figure 5:
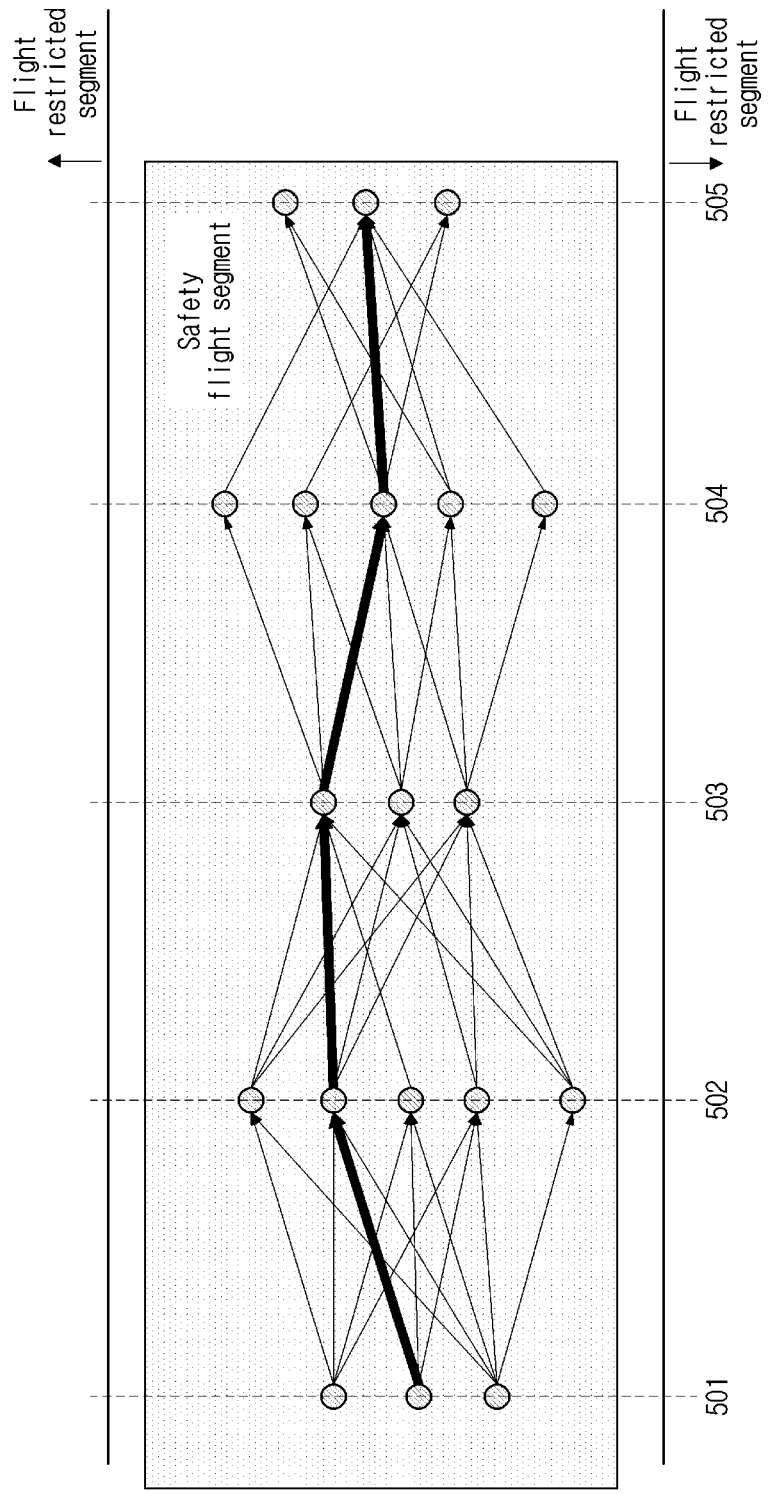
FIG. 5 is a view illustrating an operation of an unmanned delivery management device for setting a candidate travel route by combining waypoints determined based on various setting criteria, in accordance with an embodiment of the present disclosure.

FIG. 5 is a view illustrating an operation of an unmanned delivery management device for setting a candidate travel route by combining waypoints determined based on various setting criteria, in accordance with an embodiment of the present disclosure.

Referring to FIG. 5, a waypoint of a sub-segment may be set based on various setting criteria. Herein, a same location may show different altitude values according to setting criteria. A travel route manager may finally determine a travel route by connecting various waypoints.

For example, it is illustrated that a waypoint with 3 different altitude values exists at a first location 501, a waypoint with 5 different altitude values exists at a second location 502, a waypoint with 3 different altitude values exists at a third location 503, a waypoint with 5 different altitude values exists at a fourth location 504, and a waypoint with 3 different altitude values exists at a fifth location 505. The travel route manager may generate a candidate travel path by combining all the waypoints existing at the first to fifth locations. Herein, it is preferable that the travel route manager generate a candidate travel path using only waypoints present within a safety altitude range.

The travel route manager may confirm a time required for delivery (travel distance), power consumption, and travel safety (travel angle, number of waypoints, etc.) for candidate travel paths that are constructed in various ways, may determine a priority order of candidate travel routes based on the confirmed information (e.g., time required for delivery (travel distance), power consumption, and travel safety (travel angle, number of waypoints, etc.), and may arrange the candidate travel routes according to the priority order thus determined.

Figure 6A:
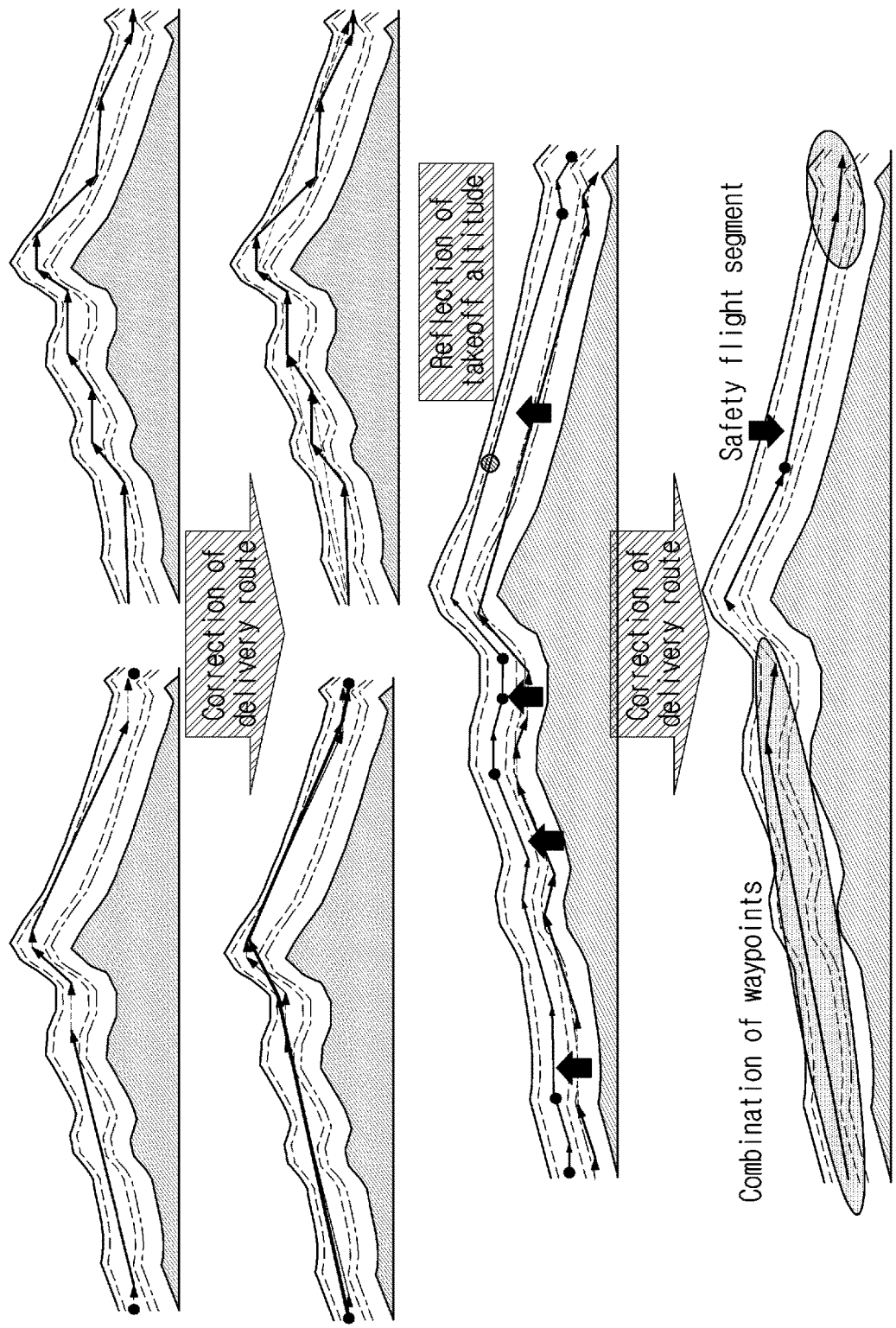
FIG. 6A and FIG. 6B are views illustrating an operation of an unmanned delivery management device for correcting a travel route according to an embodiment of the present disclosure.
Figure 6B:
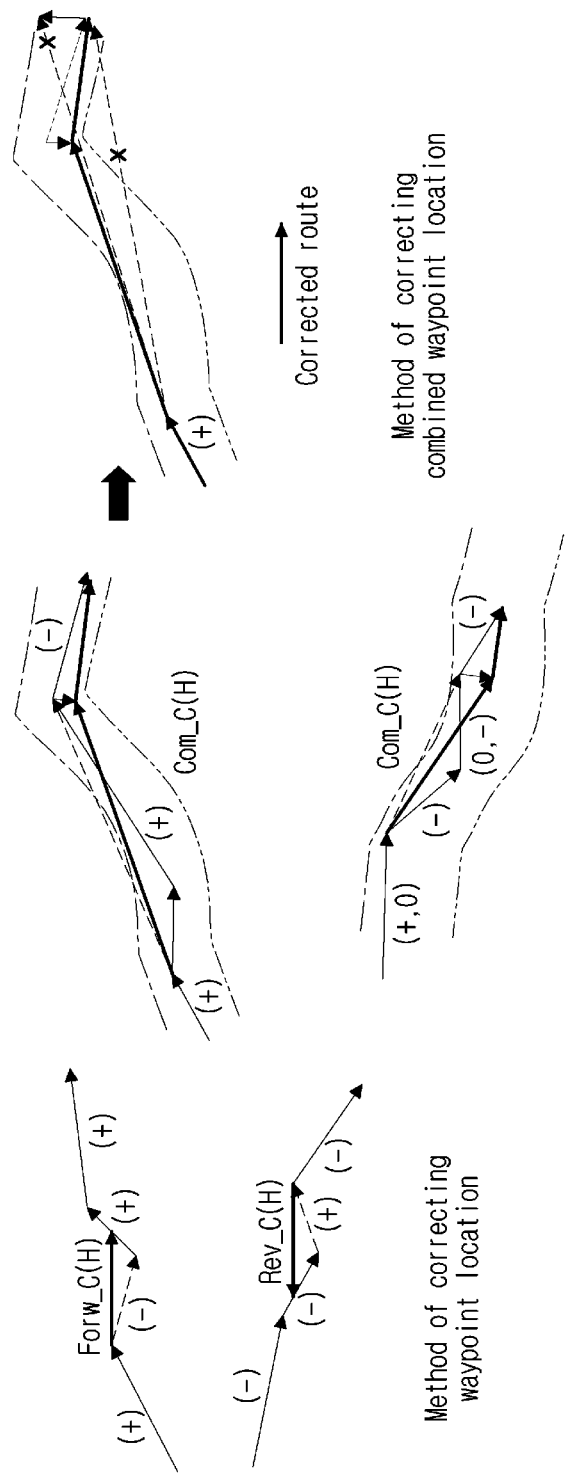

Next, the travel route manager may determine an ultimate travel route based on the candidate travel routes that are arranged according to the priority order. Moreover, the travel route manager may correct the determined travel route (refer to FIG. 6A and FIG. 6B). Correction of a travel route may be executed by correcting a combined location. Herein, correction of a combined location may be set based on various criteria. For example, the travel route manager may correct a travel route with the criterion that stable and low-power movement is possible. Specifically, the travel route manager may execute correction using variation between waypoints as a criterion. When a slope is a combination of increase followed by decrease and then increase again (increase→decrease→increase), the travel route manager may be configured to maintain a same altitude from a point, in which a change from increase to decrease in the slope starts, and to add a point, in which increase starts, as a waypoint. Meanwhile, when a slope is a combination of decrease followed by increase and then decrease again (decrease→increase→decrease), the travel route manager may be configured to horizontally move a point, in which the slope begins to increase, and to set a meeting point between the point and a decreasing section as a waypoint.

As another example, when a connecting segment deviates from a safety flight segment range during correction through combination of waypoints, the travel route manager may execute correction by lowering a waypoint value of a connecting point.

Furthermore, as described above, when determining a priority order of candidate travel routes, the travel route manager may confirm a time required for delivery (travel distance), power consumption, and travel safety (travel angle, number of waypoints, etc.). For example, in order to generate a time required for a candidate travel route, the travel route manager may calculate a flight distance of each segment by applying a travel status (horizontal segment, up-sloping segment, down-sloping segment, etc.) and a travel speed at each travel angle in each segment and by applying UTM coordinate values between waypoints. Also, the travel route manager may determine a required delivery time (or travel distance) for a corresponding candidate travel route. Also, the travel route manager may calculate power consumption (or battery remains) for a candidate travel route by reflecting power consumption according to travel status and power consumption according to weights of delivered goods.

As another example, the travel route manager may calculate weight values for a distribution of travel angles in each segment included in a candidate travel route and the number of waypoints included in the candidate travel route. Also, the travel route manager may produce delivery safety information for a candidate travel route by reflecting the weight values thus calculated.

In the procedure described above, candidate travel routes may be arranged and provided in the order of time required (or travel distance), power consumption (or battery remains) and delivery safety information.

Next, the travel route manager may select at least one travel route among candidate travel routes by considering a delivery mission and may determine the travel route as ultimate travel route. For example, as a delivery condition may include information on preferred care for fragility, preferred care for fast delivery, etc., the travel route manager may confirm the delivery condition. When the delivery condition is set to the preferred care for fragility, the travel route manager may determine a travel route with a high level of safety by considering safety and power consumption (or battery remains). For example, the travel route manager may select a travel route that has a relatively smaller change of travel angle or a relatively smaller number of waypoints. As another example, when the delivery condition is set to the preferred care for fast delivery, the travel route manager may determine a travel route with relatively shorter time required (or shorter travel distance) as an ultimate travel route by considering time required (or travel distance) and power consumption.

Figure 7:
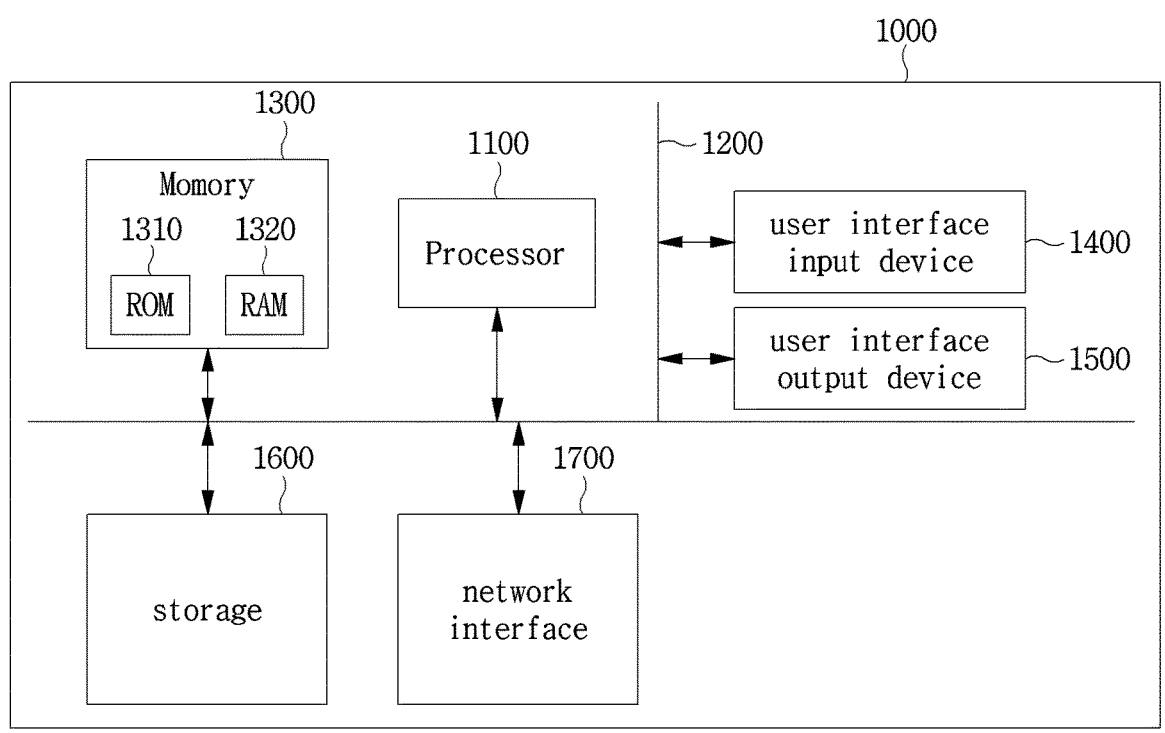
FIG. 7 is a block diagram illustrating a computing system for implementing an apparatus and method for managing unmanned delivery according to an embodiment of the present disclosure.

FIG. 7 is a block diagram illustrating a computing system for implementing an apparatus and method for managing unmanned delivery according to an embodiment of the present disclosure.

Referring to FIG. 7, a computing system 100 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or non-volatile storing media. For example, the memory 1300 may include a ROM (Read Only Memory) and a RAM (Random Access Memory).

Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. An apparatus for managing unmanned delivery, the apparatus comprising:
   at least one processor; and
   at least one of a memory and a storage including commands that when processed by the at least one processor, cause the at least one processor to:
      confirm delivery mission information provided by a user terminal;
      set a delivery waypoint based on the delivery mission information;
      set a travel route comprising a takeoff segment waypoint for a takeoff segment, a landing segment waypoint for a landing segment and a flight segment waypoint for a flight segment;
      correct the travel route according to a travel condition of an unmanned aerial vehicle (UAV);
      manage delivery mission information comprising a delivery destination of an article and a delivery method of the article and that provides the delivery mission information;
      monitor a location and status information of the UAV;
      analyze an obstacle of the UAV;
      generate UAV control information necessary for travel control of the UAV and delivery control of the article based on the travel route;
      provide the information to the UAV;
      divide the flight segment into a sub-segment unit;
      set a sub-segment waypoint corresponding to the sub-segment unit according to at least one setting criterion, the sub-segment waypoint having a plurality of different altitude values;
      generate a plurality of candidate travel routes corresponding to the at least one setting criterion, each of the plurality of candidate travel routes including the sub-segment waypoint at a different one of the plurality of different altitude values; and
      determine an ultimate travel route by combining a plurality of candidate waypoints comprised in the plurality of candidate travel routes,
   wherein the at least one setting criterion is set using at least one method among a method of setting the sub-segment waypoint using a change of topographic altitude as criterion, a method of setting the sub-segment waypoint using a point of intersection of altitude values as criterion, a method of setting the sub-segment waypoint using horizontal movement as criterion, and a method of setting the sub-segment waypoint using a difference from a previous topographic altitude value as criterion, and
   wherein the sub-segment waypoint is set by considering whether or not a difference between a topographic altitude value of the sub-segment unit and a topographic altitude value of a previous waypoint exceeds a predetermined threshold value.

2. The apparatus of claim 1, wherein the at least one of the memory and the storage further includes commands that when processed by the at least one processor, cause the at least one processor to:
  confirm a slope between a topographic altitude value of a start point and a topographic altitude value of an end point in the sub-segment unit,
  confirm an altitude value of an end point by applying the slope to an altitude value of a start point in the sub-segment unit,
  when the altitude value of the end point, to which the slope is applied, exists within a safety flight altitude range, determine a point of the altitude value of the end point, to which the slope is applied, as a candidate for setting another sub-segment waypoint, and
  when the altitude value of the end point does not exist within the safety flight altitude range, determine the start point of the sub-segment unit as the another sub-segment waypoint.

3. The apparatus of claim 1, wherein the at least one of the memory and the storage further includes commands that when processed by the at least one processor, cause the at least one processor to:
  confirm whether or not the altitude value of the start point and the altitude value of the end point in the sub-segment unit are beyond a highest altitude value or below a lowest altitude value of a safety flight altitude range, and
  when the altitude value of the start point of the sub-segment unit is identified to be beyond the highest altitude value or below the lowest altitude value of the safety flight altitude range, determine a point preceding a point of intersection between the altitude value of the start point of the sub-segment unit and the highest altitude value or the lowest altitude value as another sub-segment waypoint.

4. The apparatus of claim 3, wherein the at least one of the memory and the storage further includes commands that when processed by the at least one processor, cause the at least one processor to:
  set the start point or the end point of the sub-segment unit as a candidate waypoint, when the start point or the end point of the sub-segment unit is not beyond the highest altitude value or not below the lowest altitude value of the safety flight altitude range respectively, and
  determine the start point or the end point of the sub-segment unit as the another waypoint by considering determination for a next sub-segment unit.

5. The apparatus of claim 1, wherein the at least one of the memory and the storage further includes commands that when processed by the at least one processor, cause the at least one processor to:
  confirm whether or not a reference value of a first sub-segment is out of a safety flight altitude range with a criterion of topographic altitude value,
  confirm whether or not a reference value of a second sub-segment is out of a safety flight altitude range with a criterion of topographic altitude value, when the reference value of the first sub-segment is identified to be within the safety flight altitude range with the criterion of topographic altitude value, and
  determine a start point or an end point of the first sub-segment as a first sub-segment waypoint, when the reference value of the second sub-segment is identified to be out of the safety flight altitude range with the criterion of topographic altitude value.

6. The apparatus of claim 1, wherein the at least one processor further performs correction for the ultimate travel route based on a change between at least one of the delivery waypoint, the takeoff segment waypoint, the landing segment waypoint, the flight segment waypoint, and the sub-segment waypoint.

7. The apparatus of claim 1, wherein the at least one of the memory and the storage further includes commands that when processed by the at least one processor, cause the at least one processor to:
  arrange the plurality of candidate travel routes based on at least one criterion, and
  determine the ultimate travel route among the plurality of candidate travel routes based on an order of the arrangement.

8. The apparatus of claim 7, wherein the at least one criterion comprises at least one of a time required for delivery, a travel distance, power consumption, and travel safety.

9. The apparatus of claim 1, wherein the at least one of the memory and the storage further includes commands that when processed by the at least one processor, cause the at least one processor to:
  store and manage a condition for obstacle occurrence and a response mission during obstacle occurrence, and
  confirm whether or not the location and status information of the UAV corresponds to the condition for obstacle occurrence.

10. The apparatus of claim 1, wherein the response mission is a mission of moving to at least one of a nearest delivery destination from the location of the UAV and an emergency landing spot.

* * * * *